Sept. 15, 1953 W. R. REED 2,652,243
VERTICAL WELD ELL CUTTING AND BEVELING MACHINE
Filed Oct. 17, 1951 7 Sheets-Sheet 1
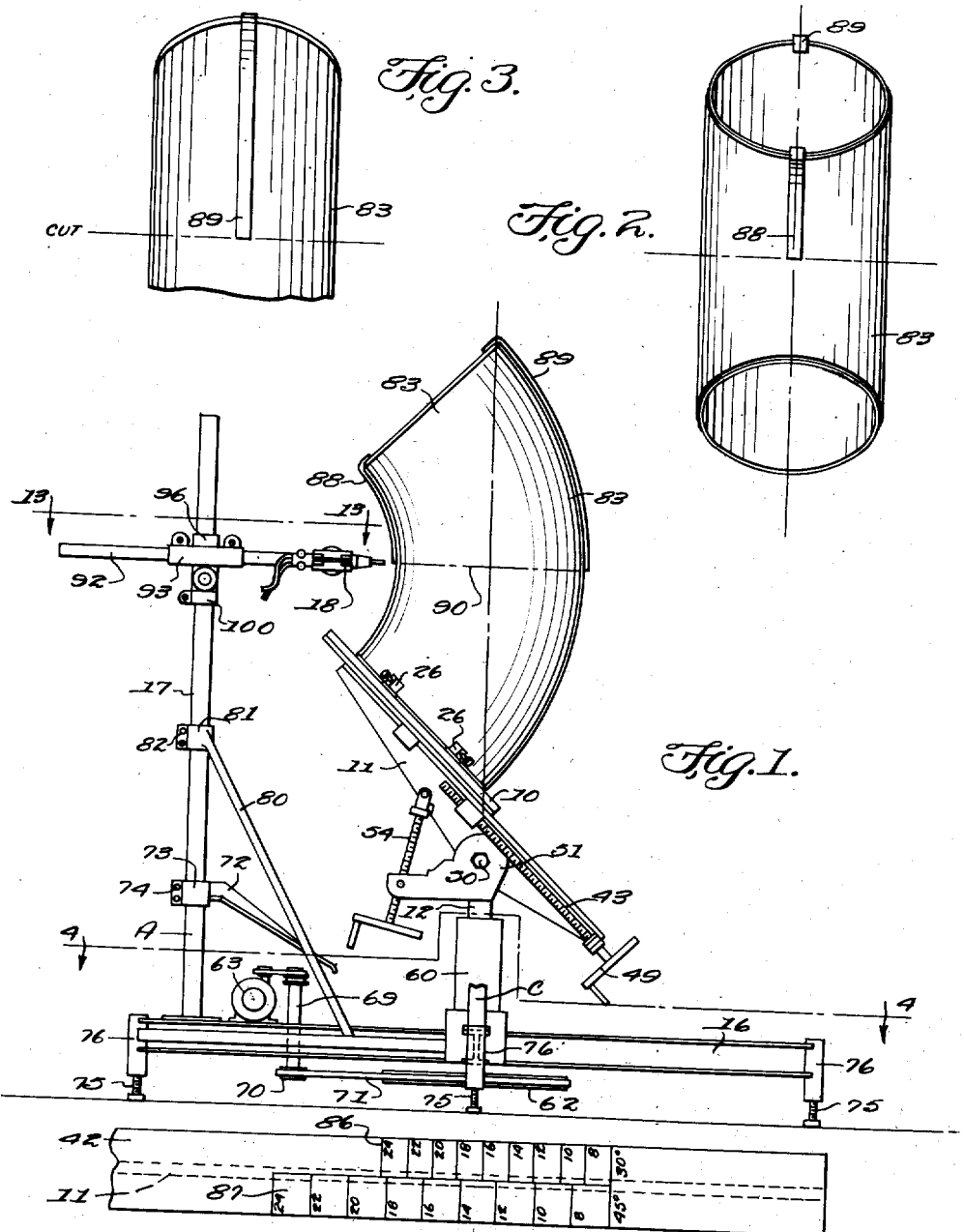
INVENTOR.
Wade R. Reed,
BY Victor J. Evans & Co.
ATTORNEYS Sept. 15, 1953           W. R. REED           2,652,243
VERTICAL WELD ELL CUTTING AND BEVELING MACHINE
Filed Oct. 17, 1951           7 Sheets-Sheet 2
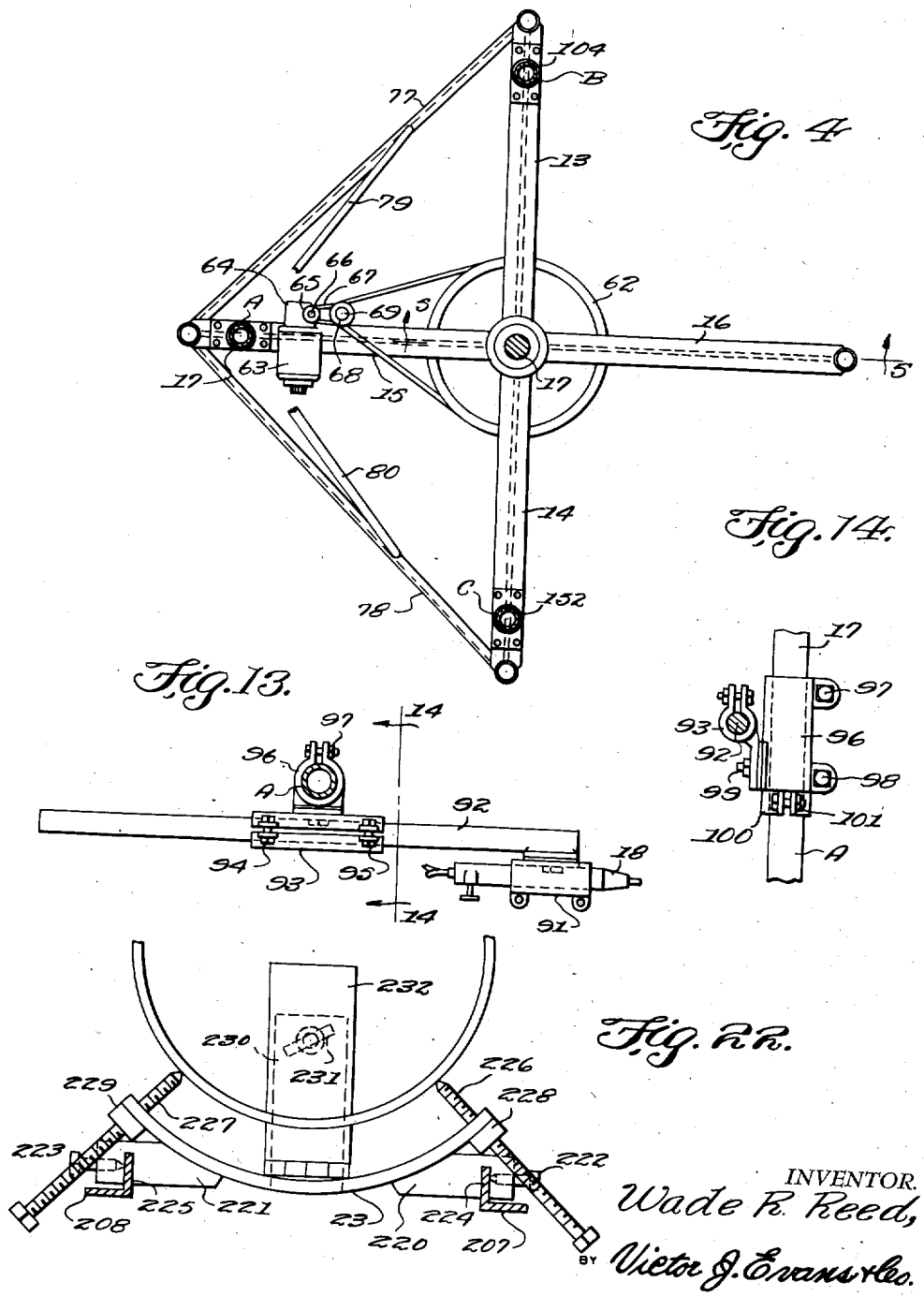

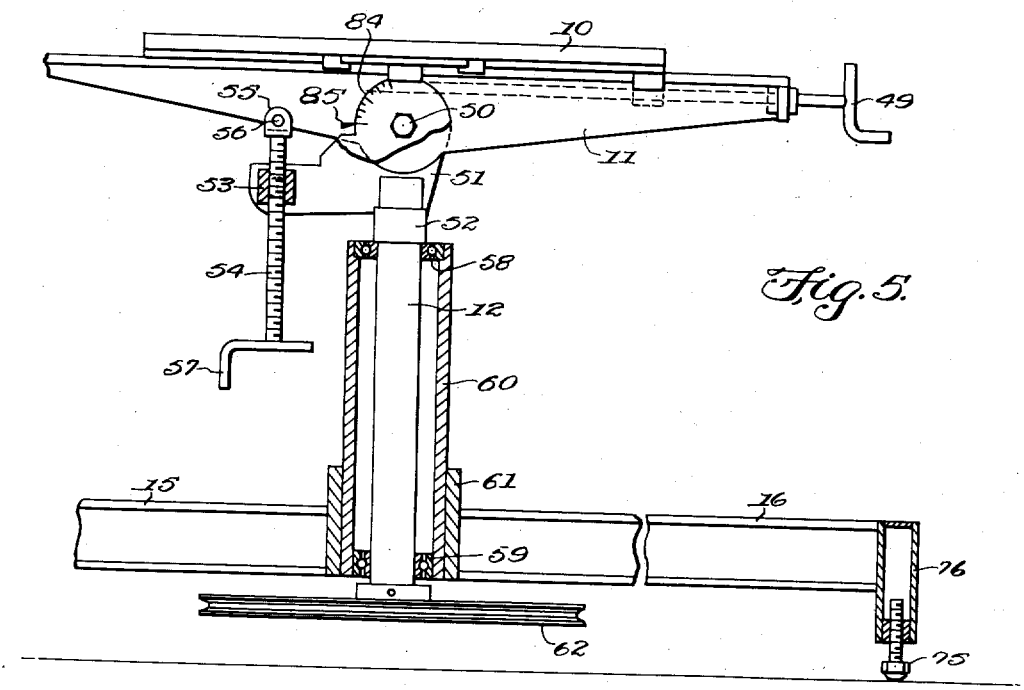

Sept. 15, 1953 W. R. REED 2,652,243
VERTICAL WELD ELL CUTTING AND BEVELING MACHINE
Filed Oct. 17, 1951 7 Sheets-Sheet 4

INVENTOR.
Wade R. Reed,
BY Victor J. Evans & Co.
ATTORNEYS

Sept. 15, 1953  W. R. REED  2,652,243
VERTICAL WELD ELL CUTTING AND BEVELING MACHINE
Filed Oct. 17, 1951  7 Sheets-Sheet 5
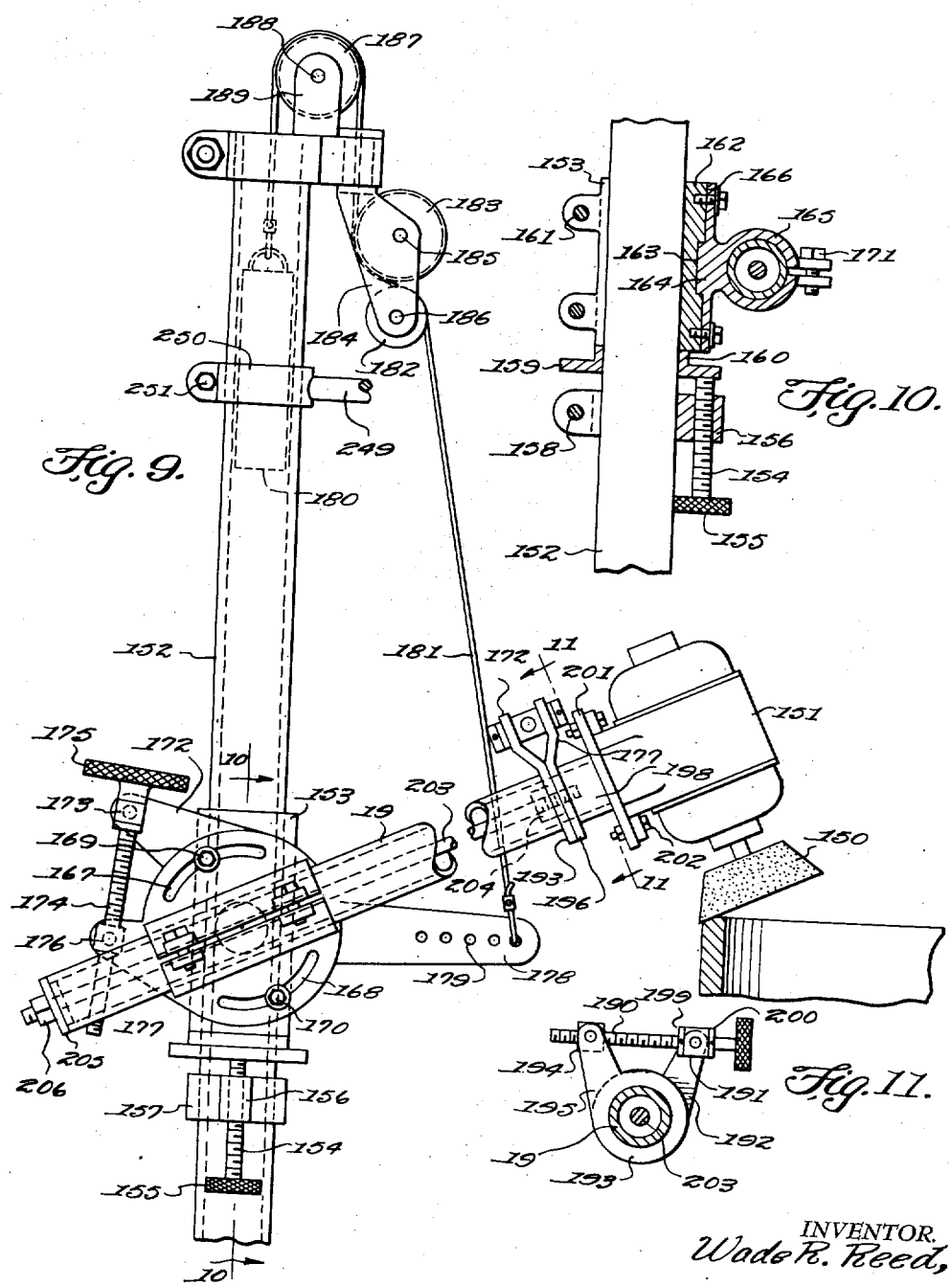

Sept. 15, 1953 W. R. REED 2,652,243
VERTICAL WELD ELL CUTTING AND BEVELING MACHINE
Filed Oct. 17, 1951
7 Sheets-Sheet 6
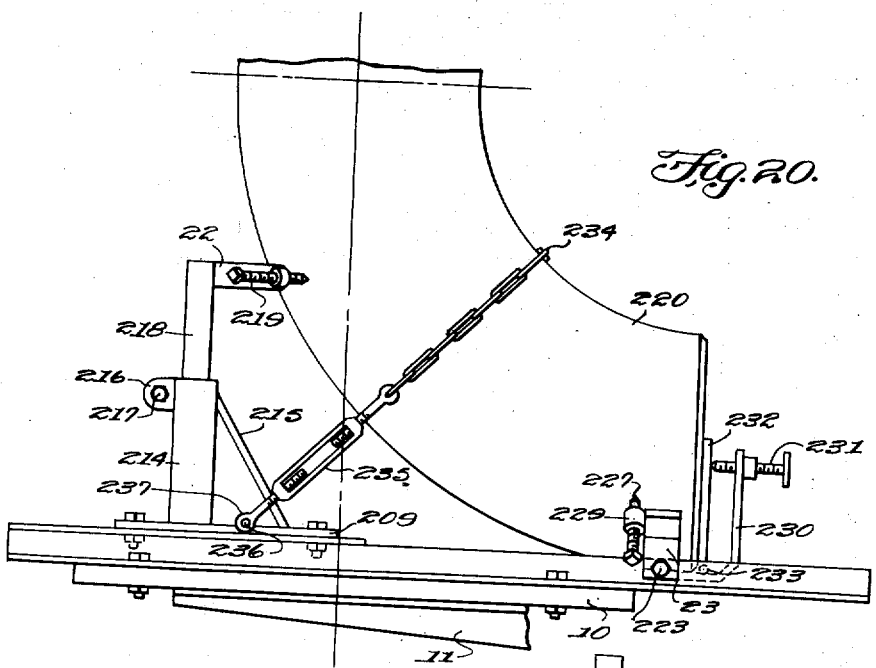
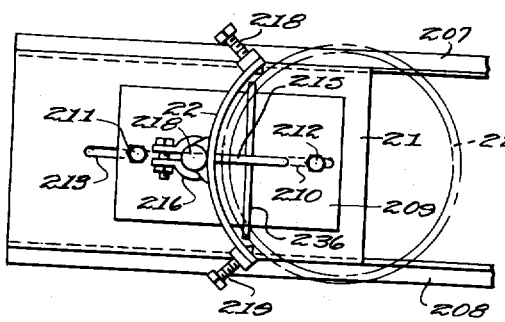
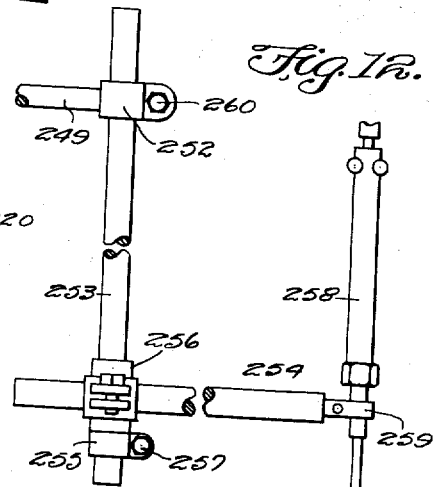
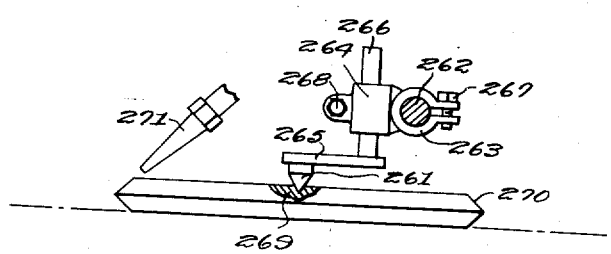
INVENTOR.
Wade R. Reed,
BY Victor J. Evans & Co.
ATTORNEYS Sept. 15, 1953 W. R. REED 2,652,243
VERTICAL WELD ELL CUTTING AND BEVELING MACHINE
Filed Oct. 17, 1951 7 Sheets-Sheet 7
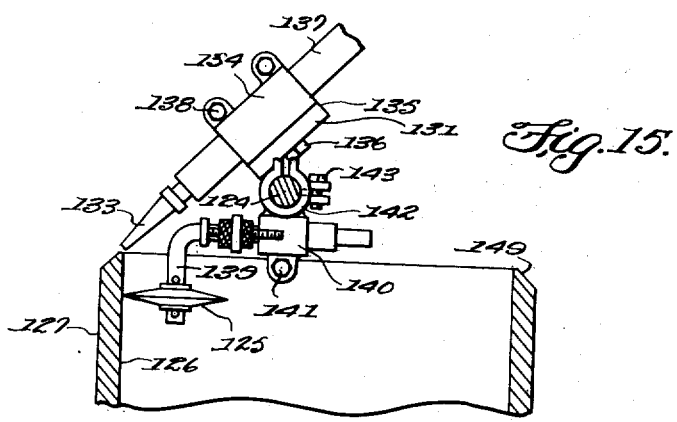
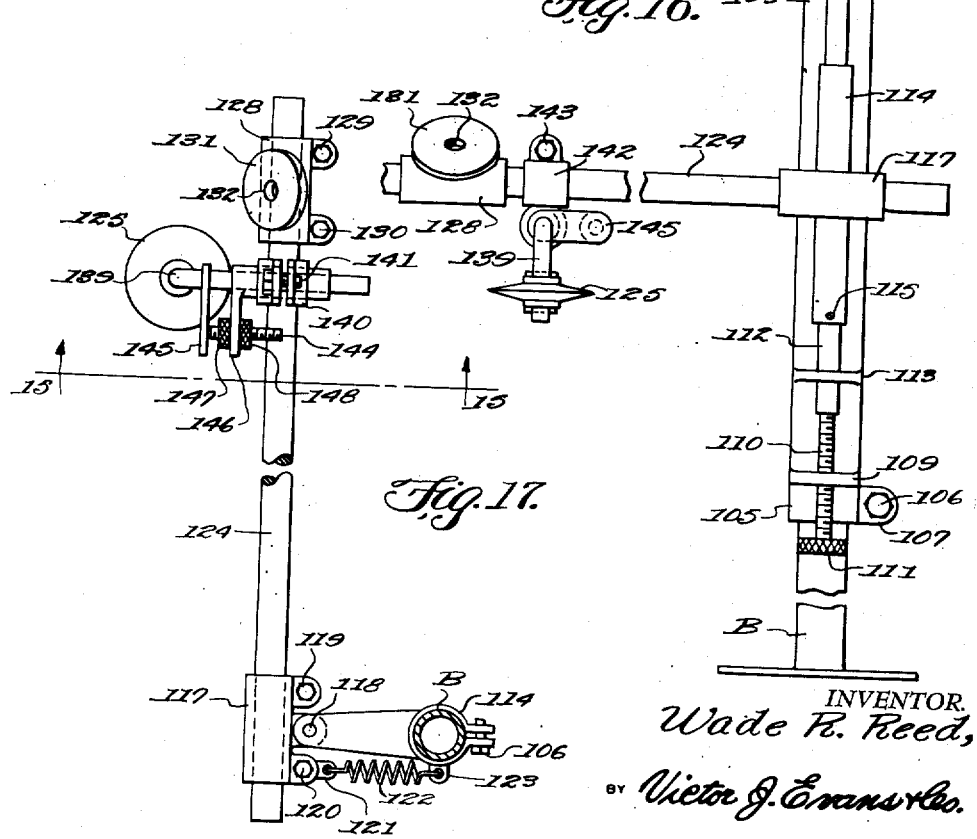
INVENTOR.
Wade R. Reed,
BY Victor J. Evans & Co.
ATTORNEYS Patented Sept. 15, 1953

2,652,243

UNITED STATES PATENT OFFICE 2,652,243

VERTICAL WELD L CUTTING AND BEVELING MACHINE

Wade R. Reed, Tulsa, Okla.

Application October 17, 1951, Serial No. 251,735

8 Claims. (Cl. 266—23)

1

This invention relates to a special machine of the machine tool type, and in particular a machine having a tilting table adjustably mounted on a frame with means for clamping weld L's on the table and with means for suspending a cutting torch and grinding wheel in operative relation to weld L's carried by said table.

The purpose of this invention is to provide a machine with which weld L's may be divided and the edges thereof beveled in the field, whereby a tube turn, such as a 90 degree elbow may be divided into two 45 degree elbows, or three 30 degree elbows, or the like.

Although weld L's are replacing pipe fittings universally and particularly in the oil industry weld L's of angles other than 90 degrees are not stocked universally and because of the large range of pipe sizes it would require an enormous stock in order to maintain a supply of weld L's of all angles desired. With this thought in mind this invention contemplates a machine or tool with which weld L's may be cut and beveled in the field so that it is only necessary to stock 90 degree elbows or turns.

The object of this invention is, therefore, to provide a machine tool on which weld L's are mounted for cutting and beveling in which the parts are readily adjustable to accommodate weld L's of different diameters and are also adjustable for cutting weld L's to different degrees.

Another object of the invention is to provide a weld L mounting table wherein a weld L mounted on the table may be rotated for cutting the wall thereof continuously through 360 degrees with a cutting torch positioned at a fixed point.

Another object of the invention is to provide a machine for holding a weld L whereby the weld L may first be cut and divided into sections and wherein the cutting element may be removed and replaced with means for cutting a bevel on the cut end of the weld L.

Another object of the invention is to provide a weld L machining tool in which means is provided for grinding a beveled edge of a weld L to a smooth finish.

Another object of the invention is to provide a weld L cutting machine in which a tube is divided into sections with a cutting torch and wherein the cutting torch may set at an angle to bevel the edge of the weld L.

A further object of the invention is to provide a weld L cutting and beveling machine in which a pre-heating device is provided for expediting the cutting operation.

2

A still further object of the invention is to provide a weld L cutting and beveling machine which is of a simple economical construction.

With these and other objects and advantages in view the invention embodies a stand having transverse and longitudinally disposed arms with elevating screws in the ends of the arms, a tilting weld L holding table adjustably mounted on the arms and having means for clamping weld L's in adjusted positions thereon, a motor for rotating the table, and a vertically disposed spindle or post for mounting a cutting torch for cutting a weld L and also for supporting a grinding wheel for finishing the cut edge of a weld L.

Although this machine is described as particularly adapted for cutting and beveling weld L's it will be understood that it is also adapted for performing similar operations on swage nipples, T's and other fittings, and the like.

Other features and advantages of the invention will appear from the following description taken in connection with the drawings wherein:

Figure 1 is a side elevational view illustrating the improved weld L cutting and beveling machine showing a weld L mounted on the table of the machine and a cutting torch positioned to cut the weld L into sections.

Figure 2 is an elevational view showing the weld L and also showing inside and outside gauges thereon.

Figure 3 is a similar view looking toward the opposite side of the weld L and showing the L with the lower part broken away.

Figure 4 is a sectional plan showing the base of the machine, taken on line 4—4 of Figure 1.

Figure 5 is a vertical section through the lower part of the machine taken on line 5—5 of Figure 4 and showing the table and tilting slide bar in horizontal positions.

Figure 6:
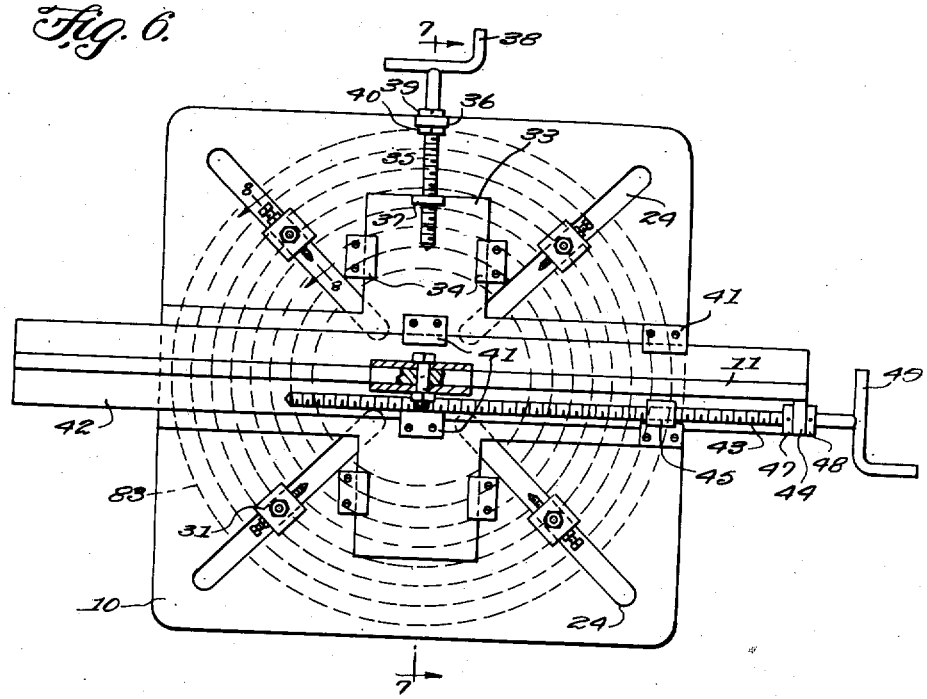
Figure 6 is a view looking upwardly toward the under side of the table or check plate taken on line 6—6 of Figure 7 and also showing the tilting slide bar.

Figure 6-A is a detail illustrating a 30 and a 45 degree scale stenciled on the face of the pivot arm for showing the position of the table for each different size of welding L or turn.

Figure 7:
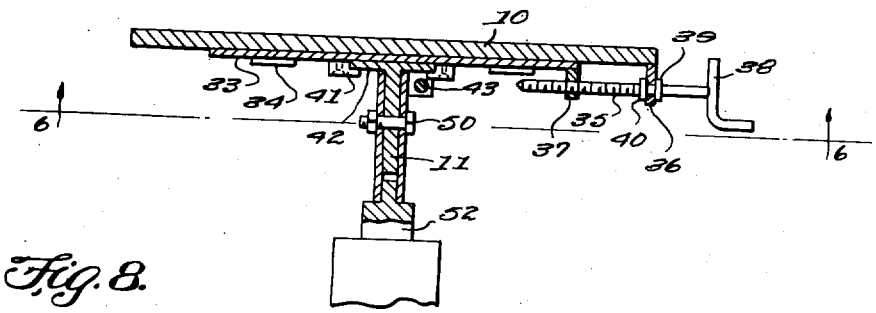

Figure 7 is a cross section through the table.

Figure 8:
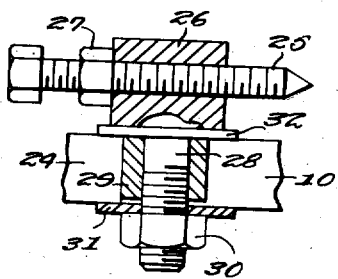

Figure 8 is a detail showing a section taken on line 8—8 of Figure 7 illustrating one of the weld L clamping screws for holding a weld L on the table and in which the parts are shown on an enlarged scale.

Figure 9 is a detail showing a grinding wheel attachment adapted to be mounted on a tubular post or spindle carried by the base frame of the machine and illustrating the grinding wheel in the position of finish grinding an end of a weld L.

Figure 10 is a vertical section taken on line 10—10 of Figure 9 illustrating the clamps for mounting the grinding wheel arm on the spindle.

Figure 11 is a detail showing a section taken on line 11—11 of Figure 9 illustrating the clamp elements for securing the grinding wheel and motor by which the grinding wheel is operated on the end of the grinding wheel arm.

Figure 12 is a view showing the holder for supporting the pre-heating torch whereby the torch may be positioned inside or outside of the weld L and may be located at the desired elevation.

Figure 13 is a sectional plan taken on line 13—13 of Figure 1 illustrating a typical mounting of a cutting torch with the torch mounted on the end of a rod and with the rod secured by clamps to the spindle or post of the machine.

Figure 14 is a cross section taken on line 14—14 of Figure 13 showing the clamps for mounting the cutting torch rod on the spindle.

Figure 15 is a detail illustrating a typical mounting of the cutting torch whereby the torch is used for beveling the end of a weld L or nipple, said section being taken on line 15—15 of Figure 17.

Figure 16 is an elevational view showing the mounting of the cutting torch shown in Figure 15.

Figure 17 is a sectional plan also showing the cutting torch shown in Figure 15 and showing the post or tube which is mounted on arm 13, Figure 4 in section.

Figure 18 is a view illustrating the use of a special level on a salvaged weld L wherein the level is secured in punch marks spaced from the end of the L and positioned to locate the position of a new cut to be made at or near the original weld.

Figure 19 is a plan view of the special level as shown in Figure 18.

Figure 20 is a side elevational view illustrating a cradle positioned on the tilting table or chuck plates of the machine to provide means for clamping salvage weld L to the table.

Figure 21 is a plan view of the cradle shown in Figure 20.

Figure 22 is a front elevational view of the cradle shown in Figure 20 showing the parts on an enlarged scale.

Figure 23 illustrates a special application of the machine tool wherein the device may be used to burn circles from plates and whereby the edges of the circles may be beveled.

Referring now to the drawing wherein like reference characters denote corresponding parts the vertical weld L cutting and beveling machine of this invention includes a table or chuck plate 10, a tilting slide bar 11 upon which the table is adjustably mounted, a spindle 12 on the upper end of which the slide bar and table are carried, a frame or base having laterally disposed arms 13 and 14 and longitudinally disposed arms 15 and 16, a post 17 mounted on the arm 15, a cutting torch 18 carried by the post 17, a grinding wheel arm 19 also adapted to be mounted on post 152, a level 20 for marking salvage L's and a cradle 21 having an upper horizontally disposed yoke 22 and a lower vertically disposed yoke 23, the cradle being adapted to be positioned on the table 10, as shown in Figure 20, and used for cutting salvaged weld L's.

The table or chuck plate 10 is formed, particularly as illustrated in Figures 6 and 7 with a plurality of radially disposed slots 24 in which clamp screws 25, which are provided with cupped or pointed ends, are adjustably mounted by chuck blocks 26, as shown in detail in Figure 8, wherein the screws 25 are threaded through the blocks 26 and secured by lock nuts 27 and the blocks are provided with threaded studs 28 that extend through bushings 29 in the slots 24. The studs are secured in position by lock nuts 30, with washers 31 between the nuts and lower surface of the table and with washers 32 positioned under the blocks 26.

The table 10 is mounted on a longitudinal and cross slide 33 with gibs 34 and the table is adjusted laterally on the cross slide with a screw 35 extended through a lug 36 on the table threaded into a lug 37 on the slide. The screw 35, which is provided with a hand crank 38 is provided with collars 39 and 40 that are positioned on opposite sides of the lug 36 whereby as the screw is rotated the slide 33 is adjusted laterally in relation to the table.

The slide 33 is mounted on the tilting slide bar 11 by gibs 41 which extend over the edges of a flange 42 on the upper edge of the slide bar as shown in Figure 7.

The position of the slide 33 and the table 10 on the tilting slide bar 11 is adjusted by a screw 43 that extends through a lug 44 on the slide bar and that is threaded through a lug 45 on a gib 46 extended from the slide 33. The screw 43 is provided with collars 47 and 48 that are positioned on opposite sides of the lug 44 and the outer end of the screw is provided with a hand crank 49.

The tilting slide bar 11 is pivotally mounted by a bolt 50 in a head 51 on the upper end of the spindle 12, the head being formed with spaced side plates and the spindle having a collar 52 that is positioned below the head.

The side plate of the head 51 extends outwardly and the bearing 53, positioned between the side plates of the head provides means for holding and adjusting screw 54, the upper bifurcated end 55 of which is pivotally attached to the tilting slide bar 11 by a pin 56. The lower end of the screw 54 is provided with a hand crank 57 by which the screw is rotated to adjust the position of the table 10 and bar 11.

The spindle 12 is journaled by bearings 58 and 59 in a cylinder 60 that is mounted on the base frame and the lower end of the cylinder is provided with a collar 61 from which the arms 13, 14, 15 and 16 extend.

The lower end of the spindle 12 is provided with a pulley 62 by which the spindle is rotated to turn the table 10 by a motor 63 which, through a gear reduction 64 rotates a pulley 65 on the upper end of a shaft 66 and a belt 67 trained over the pulley 65 is also trained over a pulley 68 on a vertically disposed shaft 69. A pulley 70 on the lower end of the shaft 69 drives a pulley 62 through a belt 71. A guard 72, in the form of a finger, extends from a hub 73, which is clamped on the post 17 by bolts 74, over the pulleys 65 and 68, as shown in Figure 1.

The ends of the arms 13, 14, 15 and 16 are provided with leveling screws 75 that are threaded into hubs 76 on the ends of the arms, also as shown in Figure 1.

The ends of the arms 13 and 14 are connected to the end of the arm 15 by struts 77 and 78, respectively, and diagonal braces 79 and 80 support the post 17 from the struts. The upper ends of the braces 79 and 80 are secured to a collar 81 that is clamped on the post 17 by bolts 82.

The face of the table 10 is provided with concentric circles 83 as indicated by the dotted lines shown in Figure 6, and these circles correspond to the diameter of different sizes of tubing, thereby facilitating positioning the tubing on the table. With the tubing positioned on the circles corresponding with the size thereof the clamp screws 25 are adjusted to grip the outer surface of the tube and with the tube positioned on the table and adjusted by the screws 35 and 43 the welding tube then may be accurately positioned on the base or frame.

When it is desired to cut a ninety degree weld L to form two 45 degree turns or L's a weld L, as indicated by the numeral 83 is clamped by the clamp screw 25 on the table 10, as illustrated in Figure 1, and the angle of the table 10 is adjusted to 45 degrees, with the horizontal, by the screw 54 and with the table and weld L rotated with the motor 63 the weld L is readily cut with the cutting torch 18.

The head 51 is provided with graduations 84 which are positioned to register with a point 85 on the tilting slide bar 11, as shown in Figure 5, whereby the angle of the table may be accurately set.

Scales 86 and 87 are stenciled on the face of the flange 42 of the tilting slide bar 11, as shown in Figure 6-A, to indicate the position of the table for each different size of welding L. The scale on one side is for 30 degree cuts and the scale on the opposite side for 45 degree cuts.

Graduated scales 88 and 89 are also provided for each size of the weld L's, the scale 88 being graduated for the inside radius and the scale 89 for the outside radius. These scales may be positioned on a tube turn as illustrated in Figure 1, and a cutting line, as indicated by the numeral 90 located thereby.

The cutting torch 18 is mounted in a clamp 91 on the end of a rod 92 and the rod 92 is adjustably held in a clamp 93, which is secured in clamping relation with the rod 92 by bolts 94 and 95. The clamp 93 is adjustably mounted on the post 17 by a clamp 96 having bolts 97 and 98 therein. The clamp 93 is secured to the clamp 96 by a bolt 99. The clamp 96 is positioned on a collar 100 that is clamped around the post 17 by a bolt 101, thereby providing a seat for the clamp 96.

The clamp 100 provides a seat or rest for the clamp 96 preventing the clamp with the cutting torch supporting bar, sliding downwardly on the post 17 when the screws 97 and 98 are released.

A torch mounting of a different type is illustrated in Figures 15, 16 and 17 wherein a clamping sleeve 103 is positioned on a column 104 that is mounted on the arm 13 of the base frame and the sleeve is adjustably held in position by a clamp 105 having a bolt 106 extended through flanges 107 thereof. The clamp 105 provides a seat retaining the clamping sleeve 103 in adjusted position on the column.

The clamping sleeve 103 is provided with arms 108 and 109 at the ends and an adjusting screw 110 with a knurled head 111 on the lower end is threaded in the arm 109, as shown in Figure 16, wherein the lower end of a shaft 112, which is slidably mounted in the upper arm 108 and in an intermediate lug 113, rests upon the upper end of the screw 110, providing means for adjusting the elevation of the shaft. A clamp 114 is secured on the shaft 112 by a set screw 115 and the clamp 114 is integral with a clamp 117.

The clamp 117 is provided with bolts 119 and 120, and a tab 121 extended from the bolt 120 is connected to one end of a spring 122, the opposite end of which is connected to a tab 123 on the sleeve 103 whereby the outer end of a torch supporting rod 124, secured in the clamp 117, is urged outwardly and a disc 125 on the outer end of the arm is resiliently held against the inner wall 126 of a tube 127.

The outer end of the rod 124 is provided with a mounting clamp 128 which is secured to the rod by bolts 129 and 130, and the clamp 128 is provided with a disc 131 having a bolt hole 132 therein whereby a cutting torch 133 is mounted on the disc 131 of the clamp 128 by a clamp 134 having a base 135. The base 135 is secured to the disc 131 by a bolt 136 and the body 137 of the torch is secured in the clamp 134 by bolts 138.

The disc 125 is suspended from the rod 124 by an L-shaped arm 139 that is secured in a clamp 140 by a bolt 141 and the clamp 140 is integral with a clamp 142 which is held by a bolt 143, on the rod 124.

The position of the arm 139 is adjustably mounted in the clamp with the arm adjusted by a threaded stud 144 carried by a bar 145 extended from the arm 139 and extended through a lug 146 carried by a sleeve 116 in the clamp 140. The stud 144 is retained in adjusted positions by lock nuts 147 and 148.

With the cutting torch 133 mounted on the machine in this manner the position of the torch is readily adjustable to cut angles of different degrees whereby beveled welding surfaces, as indicated by the numeral 149, may be cut on the ends of weld L's and the like. The cutting torch may also be adjusted to cut tubes of different sizes.

It will also be understood that a beveled edge may be smoothly finished on the ends of the weld L's or the like by grinding, as illustrated in Figures 9, 10 and 11, wherein a grinding wheel 150 carried by the shaft of a motor 151 is suspended from a tubular column 152 that is positioned on the end of the arm 14, as illustrated in Figure 4, and the motor and grinding wheel are suspended by the tubular arm 19 which is adjustably mounted on the column by a sleeve 153 the position of which is adjusted by a screw 154 having a knurled head 155 and threaded in a boss 156 of a clamp 157. The clamp is secured on the column 152 by a bolt 158 and the screw is positioned to engage the lower side of the flange 159 on a collar 160 positioned below the sleeve 153 which is clamped to the column by bolts 161.

The sleeve 153 is provided with a flat side or mounting boss 162 and the boss is provided with a centrally positioned recess 163 in which a stud 164 of a clamp 165 is positioned. The clamp is provided with a disc 166 that is positioned against the face of the boss 162 and that is provided with arcuate slots 167 and 168 through which studs 169 and 170, respectively extend for securing the clamp 165 in adjusted position on the sleeve 153. The clamp 165 is provided with bolts 171 for retaining the tubular arm 19 in adjusted positions therein.

The boss 162 of the sleeve 153 is also provided with an arm 172, the outer end of which is provided with a socket 173 through which an adjusting screw 174 having a knurled head 175 extends. The screw 174 is threaded through a socket 176 on an arm 177, which extends from one side of the disc 166 of the clamp 165. By this means with the studs 169 and 170 released the position of the tubular arm 19 is readily adjustable.

The disc 166 is also provided with an arm 178 that is provided with a plurality of bolt holes 179 and this arm is connected to a counterweight 180 by a cable 181 which extends upwardly over pulleys 182 and 183 pivotally mounted in a bracket 184 by pins 185 and 186, respectively, and from the pulley 183 the cable extends upwardly over a sheave 187 which is pivotally mounted by a pin 188 in a bearing 189. By this means the counterweight 180 retains the motor 151 and grinding wheel 150 in operative position, particularly while the parts are being adjusted. The cable and counterweight also take the load from the adjusting screws and mounting studs.

The position of the grinding wheel 150 on the outer end of the arm 19 is also adjustable axially by an adjusting screw 190 which extends through a socket 191 on an arm 192 which extends from a flange 193 on the outer end of the arm 19 and also through a socket 194 on the end of an arm 195 that is carried by a flange 196 of an outer section 198 of the arm 19, as shown in Figures 9 and 11. The screw 190 is threaded in the socket 194 and the opposite end is provided with collars 199 and 200.

The motor 151 is mounted on a flange 201 on the end of the section 198, by bolts 202 and the section 198 is secured to the end of the arm 19 by a rod 203, the outer end of which is secured in the flange 196 by lock nuts 204 and the opposite end of which is secured in a disc 205 by a nut 206.

With the grinding wheel mounted on the column 152 in this manner, a universal mounting is provided, whereby the position of a wheel 150 is readily adjustable to grind beveled surfaces at different angles and also to grind beveled surfaces on weld L's of different sizes.

The machine is also adapted for salvaging weld L's, nipples, and the like from dismantled equipment and for resurfacing the ends of salvaged weld L's the cradle including the base 21 is provided wherein the base is positioned between side bars 207 and 208 which are formed of angle iron and a plate 209 having slots 210 therein is adjustably held on the base 21 by studs 211 and 212 which extends through an elongated slot 213 in the base plate 21. A cylindrical post 214 extends upwardly from the plate 209 and the cylinder is supported by a bracket 215.

The upper end of the cylinder 214 is provided with a clamp formed with ears 216 extended from one side and held by bolts 217 whereby a bar 218 is adjustably clamped in the cylinder and the yoke 22 is carried by the upper end of the bar. The ends of the yoke 22 are provided with adjusting screws 218 and 219 and points on the inner ends of the screws are positioned to engage the surface of a weld L as indicated by the numerals 220.

The lower end of the weld L 220 is held by the yoke 23 which is mounted in the bars 207 and 208, as shown in Figure 22, the yoke being held by mounting plates 221 which are secured to the bars 207 and 208 by set screws 222 and 223 which clamp upwardly extended legs of the bars in slots 224 and 225 respectively. The ends of the yoke 23 are also provided with adjusting screws 226 and 227 that are threaded in lugs 228 and 229 respectively on the ends of the yoke.

The lower end of the weld L 220 may also be held by clamps formed with a bar 230 which extends outwardly and upwardly from the yoke 23 and which is provided with an adjusting screw 231 that engages a plate 232 which is hinged to the bar 230 by a hinge 233. By this means the end of the weld L may readily be adjusted to facilitate cutting a beveled surface on the upper end.

The weld L 220 may be secured in the cradle by a chain 234 having a turn buckle 235 therein and the ends of the chain are secured to a transversely disposed bar 236 with one end secured directly to the bar and the other end mounted on the bar by an eye 237 extended from one end of the turn buckle.

To facilitate leveling of the upper end of the weld L the level 20 is provided with a glass or bubble 238 with adjusting screws 239 and 240 and the screws are positioned in a plane parallel to the plane in which the bubble of the glass is in the center, to indicate that the level is horizontally positioned. The screw 240 is threaded in a hub 241 of a stationary jaw 242 at one end of the level and the screw 239 is threaded in a hub 243 of a movable jaw 244 adjustably mounted on the bar of the level by pins 245.

The points of the adjusting screws 239 and 240 are positioned with the points in punch marks 246 which define a cutting line 247 at or near the original weld of the weld L and with the plate 232 perpendicular to the base frame of the cradle and with the line 247 level a true 90 degree angle will be obtained between the ends of the weld L.

In some instances, due to slag inclusions in the old weld, rust or other foreign matter, it is necessary to use a pre-heating torch on the inside or outside of the L or weld L in order to make a clean cut, pre-heating the material of the weld L an inch or so ahead of the cutting torch.

For this purpose a pre-heating torch 248, as illustrated in Figure 12, is suspended from the post or one of the columns, such as the column 152, shown in Figure 9, wherein the rod 249 is supported by a clamp 250 having a bolt 251 therein, from the column 152 with a clamp 252 on the end of the rod 249 providing means for supporting a vertically positioned rod 253 on the lower end of which a bar 254 is held by a clamp 255. The bar 254 is mounted in a cross clamp 256 and the clamp 256 is positioned to rest upon the clamp 255 which is clamped to the bar 253 by a bolt 257. The torch body 258 is secured to the end of the bar 254 by a clamp 259 and the rod 253 is secured in the clamp 252 by a bolt 260.

With the pre-heating torch mounted in this manner it may readily be adjusted to different positions whereby the material of the weld L or nipple may be pre-heated just ahead of the cutting torch.

The machine may also be used for cutting discs, as illustrated in Figure 23 wherein a center 261 is suspended from a bar 262 similar to the bar 124 by clamps 263 and 264 with the center 261 carried by an arm 265 on the lower end of a shaft 266 that is held in the clamp 264. The clamp 263 is provided with a bolt 267 and the clamp 264 with a bolt 268.

With the center 261 adjustably mounted it may be positioned in a punch mark or recess 269 in a disc 270 and a torch 271 similar to the torch 137 may be used for cutting the periphery of the disc with the disc cut on a bevel as shown, or the edge of the disc may be cut straight or to any angle desired.

With the different elements of the machine assembled as disclosed and described a universal machine is provided that is particularly adapted for cutting new and salvaged weld L's, swage nipples, T's and the like and by using torches and grinding elements the fittings may be cut on straight line and the edges beveled or otherwise formed to facilitate welding.

Although several operations are disclosed and described it will be understood that numerous operations may be performed on the machine and parts thereof.

It will be understood that modifications may be made in the design and arrangement of the parts without departing from the spirit of the invention.

What is claimed is:

1. In a weld L cutting and beveling machine, the combination which comprises a base frame having horizontally positioned radially disposed arms, leveling screws threaded in the lower surfaces of the arms, a vertically disposed cylinder mounted on said base frame, a spindle having a head on the upper end journaled in said cylinder, a tilting slide bar pivotally mounted in the head of the spindle, a slide plate slidably mounted on said slide bar, a table slidably mounted on said slide plate, an adjusting screw for adjusting the position of the table on the slide plate of the tilting slide bar, an adjusting screw for adjusting the angle of the table, slide plate and slide bar in relation to the spindle, means positioned on the base frame for rotating the spindle, slide plate, and table, a vertically disposed post spaced from the cylinder and spindle and extended upwardly from the base frame, clamping screws mounted on the table and positioned to rigidly clamp a weld L to the table, a rod adjustably mounted by clamps on the post, and a cutting torch carried by the rod and positioned to operatively engage a tube turn positioned on the table.

2. A weld L machine as described in claim 1, in which gauge bars are provided for indicating a cutting line on a weld L.

3. A cutting and beveling machine as described in claim 1, having means for positioning the cutting torch carried by the rod on the post at an angle to cut a bevel surface on an end of a weld L.

4. In a machine as described in claim 1, a cradle positioned on the base and adjusting screws in the cradle for positioning a weld L therein, whereby the weld L is positioned to be machined with the cutting tool carried by the post.

5. In a machine as described in claim 1, an arm adjustably mounted on a member extended upwardly from said base frame, a grinding wheel carried by said arm, means operating said grinding wheel, and means adjusting said arm and grinding wheel in relation to an element mounted on the base frame.

6. In a machine as described in claim 1, an arm adjustably mounted on a member extended upwardly from said base frame, a grinding wheel carried by said arm, means operating said grinding wheel, means adjusting said arm and grinding wheel in relation to an element mounted on the base frame and a counterweight for urging the outer end of the arm with the grinding wheel thereon upwardly.

7. A machine as described in claim 1, wherein the tool carried by the post is a cutting torch and the base frame is provided with an additional column having a disc suspended from an arm adjustably mounted on the column and the disc is positioned to engage the inner surface of a weld L or the like carried by the table with the weld L positioned to be cut by said torch.

8. In a weld L cutting and beveling machine, the combination which comprises a base frame having radially disposed arms, leveling screws threaded in the arms, a cylinder mounted on said base frame, a spindle having a head on the upper end journaled in said cylinder, a tilting slide bar pivotally mounted in the head of the spindle, a slide plate slidably mounted on said slide bar, a table slidably mounted on said slide plate, an adjusting screw for adjusting the position of the table on the slide plate of the tilting slide bar, an adjusting screw for adjusting the angle of the table, slide plate and slide bar in relation to the spindle, means positioned on the base frame for rotating the spindle, slide plate and table, a post spaced from the cylinder and spindle and extended upwardly from the base frame, clamping screws mounted on the table and positioned to rigidly clamp a weld L to the table, a rod adjustably mounted by clamps on the post, and a cutting torch carried by the rod and positioned to operatively engage a tube turn positioned on the table.

WADE R. REED.

References Cited in the file of this patent

UNITED STATES PATENTS

| Number | Name | Date |
|---|---|---|
| 1,716,129 | Hazleton | June 24, 1929 |
| 1,974,459 | Haubroe | Sept. 25, 1934 |
| 2,012,274 | Goebert | Aug. 27, 1935 |
| 2,057,612 | Formont | Oct. 13, 1936 |
| 2,383,607 | Lovers | Aug. 28, 1945 |
| 2,384,128 | Nation | Sept. 4, 1945 |

FOREIGN PATENTS

| Number | Country | Date |
|---|---|---|
| 412,788 | Germany | Aug. 27, 1925 |